Sept. 15, 1925.
J. R. OISHEI
1,554,023
WINDSHIELD AND FITTING THEREFOR
Filed Dec. 22, 1919
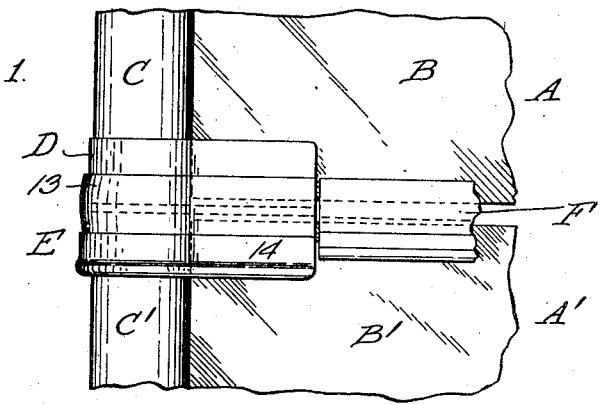
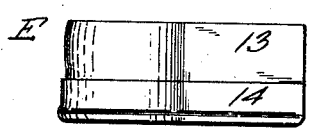
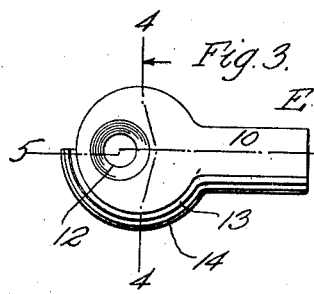
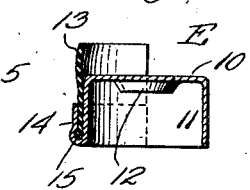
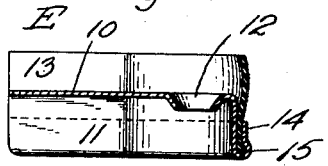
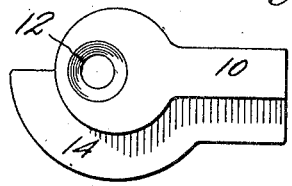
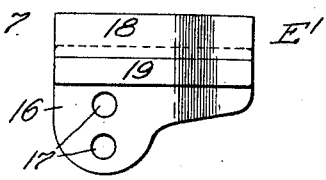
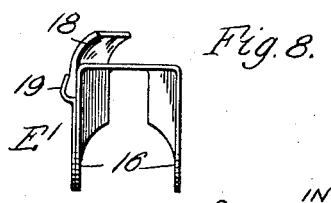
INVENTOR.
John R. Oishei
By Parker & Prochnow,
ATTORNEYS.

Patented Sept. 15, 1925.

1,554,023

UNITED STATES PATENT OFFICE.

JOHN R. OISHEI, OF BUFFALO, NEW YORK.

WINDSHIELD AND FITTING THEREFOR.

Application filed December 22, 1919. Serial No. 346,509.

*To all whom it may concern:*

Be it known that I, JOHN R. OISHEI, a citizen of the United States, residing at Buffalo, in the county of Erie and State of New York, have invented a new and useful Improvement in Windshields and Fittings Therefor, of which the following is a specification.

This invention relates to fittings for vehicle windshields for the purpose of effectually sealing or making weather-tight cracks between the adjacent edges of the glasses or parts of the windshields. Automobile windshields are commonly composed of sections or parts, one or both of which is or are adapted to swing to different positions, and there ordinarily exists an intervening crack or space between the adjacent edges of such sections or parts.

In windshields of this sort the frame for the glass of each section usually extends along the opposite ends and one horizontal edge of the glass and is provided adjacent the free edge of the glass with corner fittings or caps which are secured on the end frame bars and extend inwardly therefrom over the edge of the glass for a short distance and retain the glass in the frame. It is now usual to employ a suitable weather strip to close the crack or space between the adjacent edges of the glasses or parts. These weather strips, however, ordinarily fit on the edge of one glass and extend only to the inner ends of the corner fittings before-mentioned, and the spaces between the adjacent corner fittings on the two sections or parts of the windshield remains open and allows rain or snow and cold air to enter at these points.

One object of this invention is to provide a practical, inexpensive fitting for windshields which will effectually overcome the objection stated and will cooperate with the usual weatherstrip to properly close the space between the two sections of the windshield across their entire width.

Another object is to provide a device of this sort with a flexible or resilient part which will closely engage the more or less irregular surface of the adjacent corner fitting and effectually seal the space between the end portions of the windshield sections, but will not prevent the usual adjustments or movements of the windshield section or sections.

In the accompanying drawings:—

Fig. 1 is a fragmentary front elevation of a windshield provided with a fitting embodying the invention and showing the same cooperating with a weatherstrip to completely close the space between the adjacent edges of the two parts of the windshield.

Fig. 2 is a front elevation of the fitting detached.

Fig. 3 is a plan view thereof.

Figs. 4 and 5 are respectively longitudinal and transverse sectional elevations thereof on lines 4—4 and 5—5, respectively, Fig. 3.

Fig. 6 is a plan view of the metal stamping for the fitting as it appears when partly formed.

Figs. 7 and 8 are respectively a side and end elevation of a windshield fitting of slightly modified form.

In Fig. 1 of the drawings is shown a portion of a sectional windshield comprising an upper section A and a lower section A'. With the exception of the corner fittings mentioned the windshield is of ordinary construction. The upper section A includes the usual glass B and the frame which bounds the upper and opposite end edges of the glass. A portion of one of the end bars of this frame is shown at C. The lower section A' is of similar construction, including the glass B' and the frame which extends around the lower and end edges of this glass, and a portion of one end bar of which is shown at C'. As ordinarily constructed, each glass is confined in channels or grooves in its frame and is adapted to be inserted into its frame between the two end bars thereof. The glass is retained in the frame by corner fittings or caps which are secured on the ends of the two end bars of the frame and project therefrom inwardly or towards each other and embrace the unframed edge of the glass. The caps or corner fittings on one of the windshield sections may be of the usual construction. One of them is shown at D. The other section of the windshield has analogous caps or corner fittings which are arranged on this section and perform like functions as the caps or fittings D, but are constructed, as presently described, so as to close the space between the opposite corner fittings on the two sections to prevent the passage of the elements through the space between the two fittings. One of these caps or corner fittings is shown at E. As shown in Fig. 1, the ordinary fittings D are employed on the upper windshield section and the improved fittings E on the lower section, but this arrangement can be reversed and the improved caps or fittings E used on the upper section. The two caps or fittings E at opposite ends of the windshield are similar and only one is herein shown and described. This cap or fitting E, as shown in Figs. 1–6, is constructed as follows:

The body of the cap is of substantially U-shape in cross section, having a horizontal top plate 10 and a vertical flange 11 which extends around the outer end and along two sides of the cap. The outer end portion of the cap or fitting is shaped to slip over and fit snugly on the end of the end bar C' of the frame, and the remaining or inner portion of the cap or fitting is constructed and adapted to embrace or fit the upper unframed edge of the glass B'. The cap or fitting is secured on the end bar C' as by means of a screw or fastening passing through a hole 12 in the top plate of the fitting. As thus far described the fitting E is similar to the usual caps D. The cap or fitting E is provided with a closure member or strip 13 of resilient or flexible material which is secured at one edge to and extends along one side of the cap or fitting from the inner to the outer end thereof. As illustrated, this closure member may conform in arc like shape to the end of the plate 10 and partially surround the outer edge of the plate. This closure strip projects beyond the top plate 10 of the cap or fitting far enough to cross the space between the cap and the opposite cap D on the other section of the windshield and close or seal the space between the two caps or fittings. The closure strip 13 is made of rubber or other suitable resilient or flexible material and is preferably curved in cross section or formed so that its free edge deflects inwardly over or toward the cap so that when the two sections of the windshield A A' are in alinement the free edge of the closure strip 13 will be pressed firmly against the side face of the opposing cap or part of the windshield. The closure strip also conforms to or follows the irregular form of the cap E preferably extending to the extreme outer edge of the cap E and bears throughout its length against the face of the cap D. A tight closure of the space between the corner fitting is thus insured at the end edges as well as at the sides.

The closure strip 13 is secured to the cap or fitting E between the flange 11 at one side of the cap and an integral extension 14 of this flange, which is bent over the edge of the closure strip and clamps the latter firmly against the side of the cap. Before the securing edge or extension is bent over to fasten the closure strip, it extends out from the flange of the cap as shown in Fig. 6. Preferably the closure strip is formed with an edge bead or enlargement 15 over which the securing edge 14 is bent. This makes a secure connection of the closure strip with the cap and prevents its detachment. The closure strip 13 is thin and flexible enough to give or bend and permit the usual movement or adjustments of the windshield section or sections. The securing edge 14 preferably terminates below the top of the cap so that it will not cut or injure the closure strip when the latter is bent outwardly by the adjustment of the windshield.

In the modified construction shown in Figs. 7 and 8, the cap or corner fitting E' is of a somewhat different shape suitable to fit a different shaped frame. This cap or fitting consists of an open-ended, substantially U-shaped body, the outer portion of which is wide and shaped to fit the end of the frame or bar to which it is applied and the inner portion is constructed to embrace and fit the adjacent unframed edge portion of the glass. The flanges 16 of the cap or fitting are also deeper at their outer ends and are provided with holes 17 for rivets or fastenings for securing the fitting on the frame. The weatherstrip or closure member 18 in this construction extends along one side of the cap or fitting and is secured between the flange at this side and a separate securing plate 19, which is welded or otherwise secured on the side or flange of the fitting and has a bent edge or lip between which and the side of the fitting the closure strip is clamped. This construction is better adapted for caps or corner fittings having flanges with irregular shaped edges which are not well adapted for bending to provide the securing lip or edge.

F represents a weatherstrip which extends along the crack between the windshield sections or parts from the corner caps at one end of the windshield to those at the other end thereof. This weatherstrip may be of any usual or suitable construction adapted to be applied to the windshield and close the crack. The weatherstrip and the two corner caps or fitting at the opposite ends thereof, close the crack substantially continuously from end to end of the windshield.

The windshield fitting described is very practical in use. The closure strip or member, by reason of its resiliency and shape, firmly engages the irregular surface of the opposing corner fitting and tightly seals the opening between the end portions of the windshield sections, thus cooperating with the weatherstrip F to effectually close the crack between the windshield sections throughout its entire length. The corner fittings or caps equipped with the closure members can be manufactured cheaply so that they can be put on a windshield instead of or to replace the usual corner caps or fittings at small expense.

The closure strip 13 is thin and flexible so that it is adapted to bend readily and permit the movable section A of the windshield to deflect the strip and swing past the same whether the windshield section is swung outwardly or inwardly. Since the body of the cap is preferably made of thin sheet metal, its top plate 10 occupies very little vertical space between the windshield sections. The combined thickness of the top plate and the closure strip is such that if the closure strip is bent inwardly over the top plate between the two windshield sections it will not obstruct the movement of the swinging section, which can, therefore, be swung back and forth past the other section notwithstanding the use of the fitting E. Nevertheless the normal inward deflection of the closure strip is such that it will bear firmly against the opposing part of the windshield and effectually seal the crack between the sections.

I claim as my invention:

1. A wind shield fitting for closing the space between the end portions of adjacent parts of a wind shield comprising a body shaped to fit and be secured to one of the frame bars of the wind shield and to engage the adjacent portion of the edge of the wind shield glass, and a thin flexible closure strip secured to and extending along one side and a portion of the outer end of said body, said closure strip projecting beyond said body to bear against the opposed wind shield part and to partially surround the opposed wind shield frame bar.

2. The combination with a windshield having frame bars normally alined and spaced apart at the ends thereof, of a fitting adapted to close the space between the ends of the frame bars, said fitting comprising a thin metal body of lesser thickness than the space between said frame bar ends and which fits over the end of one of the frame bars and has a portion which engages the adjacent portion of the edge of the windshield glass, a thin flexible closure strip which extends along and conforms to the shape of one side only of said body, said closure strip projecting beyond said body to bear against the face of the opposed windshield part, and a securing strip between which and said side of the body said closure strip is secured, whereby the space between said windshield frame bar ends is closed while permitting one of said windshield parts to swing relatively to the other in either direction.

3. The combination with a windshield having frame bars at the ends thereof, of normally opposed fittings secured on the ends of said frame bars, one of said fittings comprising a substantially horizontal plate portion adapted to be secured on an end of one of said frame bars and a reduced portion extending therefrom and adapted to overlie an edge of the windshield glass thereadjacent, an integral vertical flange depending from the sides and outer end of said plate and reduced portion, said vertical flange of one of said fittings having at one side and around a portion of the outer end of said plate a portion bent upon itself to provide a seat for a closure strip, and a resilient closure strip in said seat, said strip projecting beyond said plate and reduced portion to close the space between the ends of said frame bars and the space between the edges of the windshield glass at said reduced portion.

Witness my hand this 17th day of December, 1919.

JOHN R. OISHEI.